(12) United States Patent
Hirayanagi et al.

(10) Patent No.: US 6,283,265 B1
(45) Date of Patent: Sep. 4, 2001

(54) WET TYPE MULTIPLATE CLUTCH

(75) Inventors: Tsuyoshi Hirayanagi, Toyohashi; Shigeki Umezawa, Kakegawa, both of (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/449,360

(22) Filed: Nov. 24, 1999

(51) Int. Cl.[7] ............... F16D 25/0638; F16D 13/68; F16D 13/74
(52) U.S. Cl. ............... 192/70.12; 192/70.2; 192/113.36
(58) Field of Search ............... 190/70.12, 113.34, 190/113.35, 113.36, 85 AA, 107 R, 70.2

(56) References Cited

U.S. PATENT DOCUMENTS

| | | | |
|---|---|---|---|
| 4,287,978 | * | 9/1981 | Staub ............... 192/113.36 |
| 4,450,944 | * | 5/1984 | Fujioka et al. ............... 192/70.12 |
| 5,094,331 | * | 3/1992 | Fijimoto et al. ............... 192/70.12 |
| 5,101,953 | * | 4/1992 | Payvar ............... 192/107 R |
| 5,439,087 | * | 8/1995 | Umezawa ............... 192/70.2 |
| 5,682,971 | * | 11/1997 | Takakura et al. ............... 192/107 R |
| 6,062,367 | * | 5/2000 | Hirayanagi et al. ............... 192/107 R |

FOREIGN PATENT DOCUMENTS 11-141570 * 5/1999 (JP).

* cited by examiner

*Primary Examiner*—Rodney H. Bonck
(74) *Attorney, Agent, or Firm*—Miles & Stockbridge P.C.

(57) ABSTRACT

In a wet type multiplate clutch wherein outer tooth plates and inner tooth plates rotatable relative to each other are coaxially alternately disposed and are frictionally engaged with each other, of a plurality of oil grooves having opening portions opening to the inner peripheral edges of frictional materials secured to the inner tooth plates, at least 50 percent of the opening portions are opposed to a lubricant supply hole formed in a hub.

22 Claims, 12 Drawing Sheets

WET TYPE MULTIPLATE CLUTCH

BACKGROUND OF THE INVENTION

1. Field of the Invention

This invention relates to a wet type multiplate clutch for use in the automatic transmission of an automobile or the like, and more particularly to improvements in the positional relation between an oil groove for lubrication provided in a frictional material and the lubricant supply hole of a hub.

2. Related Background Art

Figure 18:
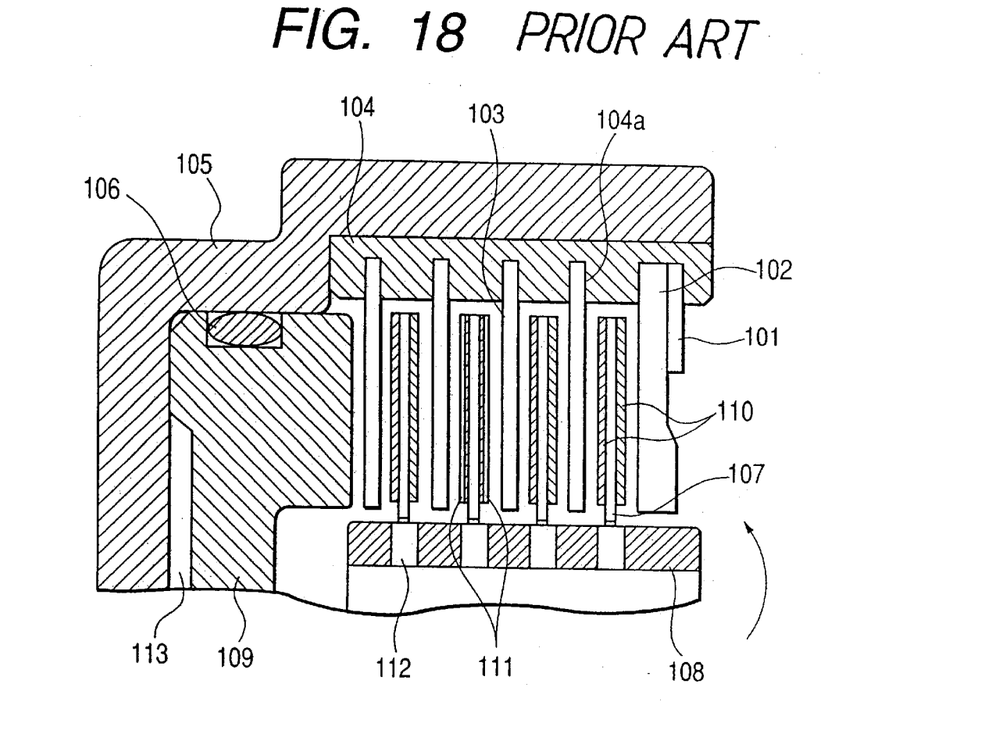
FIG. 18 is an axial cross-sectional view of the upper half showing the general construction of a conventional example.

FIG. 18 of the accompanying drawings is an axial cross-sectional view of a wet type multiplate clutch according to the prior art, and shows only the upper half thereof. A cylindrical retainer 104 is disposed on the inner periphery of a drum 105, and splines 104a are formed in the inner periphery of the retainer 104. Annular separator plates 103 are in meshing engagement with the splines 104a.

Respective friction plates 107 are disposed between adjacent ones of the separator plates 103, and teeth of the inner peripheral edges thereof are in meshing engagement with splines provided on the outer periphery of a hub 108. A flange 102 for receiving the friction plate 107 is disposed on the drum opening side end portion of the retainer 104, and is axially fixed by a snap ring 101. On the other hand, a piston 109 is provided on the closed side of the drum, and oil is introduced into an oil chamber 113 and pressure is created, whereby the piston is axially moved and brings each friction plate 107 and adjacent separator plate 103 into frictional engagement with each other.

An O-ring 106 which is a seal member is provided on the sliding surface of the piston 109. Lubricant supply holes 112 are formed in the hub 108 rotatable in the direction of the arrow so as to cool frictional materials 110 secured to the friction plates 107.

Figure 19:
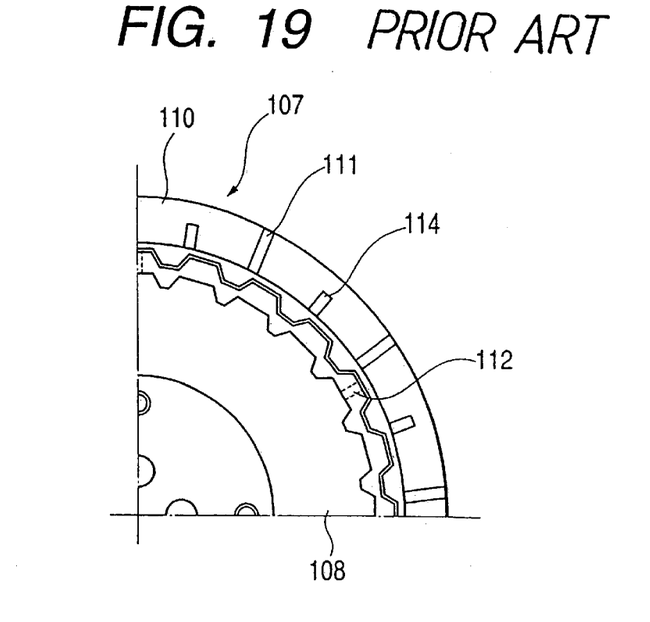
FIG. 19 is a front view of a friction plate in the conventional example.

FIG. 19 of the accompanying drawings is a front view of a friction plate 107 meshing with the spline of the hub 108. FIG. 19 shows a quarter of the whole.

The hub 108 is formed with lubricant supply holes 112, and the frictional materials 110 are formed with through-oil grooves 111 extending through the inner and outer edges thereof and enhancing the cooling effect, and non-through-oil grooves 114 opening only to the inner peripheral edge and reducing the initial coefficient of dynamic friction during the frictional engagement thereof.

In the conventional example shown in FIG. 18, with regard to the second one from the piston side, the opening portion of the through-oil groove 111 is located at the front of the lubricant supply hole, but the opening portions of the through-oil grooves 111 of the other friction plates 107 are not opposed to the lubricant supply holes 112.

In recent years, the fact that drag torque is created by the viscosity of the lubricant used in the wet type multiplate clutch and results in a reduction in efficiency has posed problems. These problems cannot be solved by the conventional construction.

SUMMARY OF THE INVENTION

Accordingly, it is an object of the present invention to provide a wet type multiplate clutch in which the construction of oil grooves in frictional materials is improved to thereby reduce drag torque and improve the dischargeability of a lubricant.

To achieve the above object, the wet type multiplate clutch of the present invention is a wet type multiplate clutch in which outer tooth plates and inner tooth plates rotatable relative to each other are coaxially alternately disposed and are frictionally engaged with each other, wherein among a plurality of oil grooves having opening portions opening to the inner peripheral edges of frictional materials secured to said inner tooth plates, at least one of said opening portions is opposed to a lubricant supply hole formed in a hub.

Of the plurality of oil grooves having opening portions opening to the inner peripheral edges of the frictional materials secured to the inner tooth plates, at least one of the opening portions is opposed to the lubricant supply hole formed in the hub and therefore, the efficiency of the supply of the lubricant to the oil grooves formed in the frictional materials increases. Also, non-through-oil grooves have the function of pressure created therein urging the plates away from one another.

Further, by adopting a shape in which only the particular portions of splines differ from one another, the error of assembling can be prevented. Also, of the lubricant supplied through the lubricant supply holes, the rate at which it is supplied to the oil groove in which the opening portion opposed to the lubricant supply hole is located is 50% or more. Specifically, lubricant supply holes of the same shape are disposed at equal intervals in the hub, and the rate at which said opening portions of said oil grooves are located at the front of said lubricant supply holes may be 50% or more.

According to one aspect of the invention, there may be two kinds of oil grooves, namely oil grooves extending through the inner peripheral edge and the outer peripheral edge and oil grooves extending through only the inner peripheral edge. The two kinds of grooves may be alternately radially disposed at equal intervals. Oil grooves having an angle of inclination with respect to the center line thereof (i.e., non-radial oil grooves may also be used).

Further, particular portions of the inner tooth plates and the splines of the hub may be of different shapes, so that when they are combined together at a position whereat they can be combined together, the at least one oil groove opening portion is positioned at a position opposed to a lubricant oil supply hole. For example, convex portions or concave portions may be formed on the particular portions of the splines of the hub, and mesh with concave portions or convex portions formed on the splines of the inner tooth plates, and the pitch of the peak portions or the pitch of the valley portions of the splines formed on the hub differs at particular portions. When the oil grooves having an angle of inclination are used, the differently shaped portions of the hub and the inner tooth plates may be made asymmetrical in order to prevent the assembling in the opposite direction and thereby assure proper orientation of the inclined oil grooves relative to the direction of rotation.

DESCRIPTION OF THE PREFERRED EMBODIMENTS

Each embodiment of the present invention will hereinafter be described in detail with reference to the accompanying drawings. In the drawings, like portions are designated by like reference numerals.

(First Embodiment)

Figure 1:
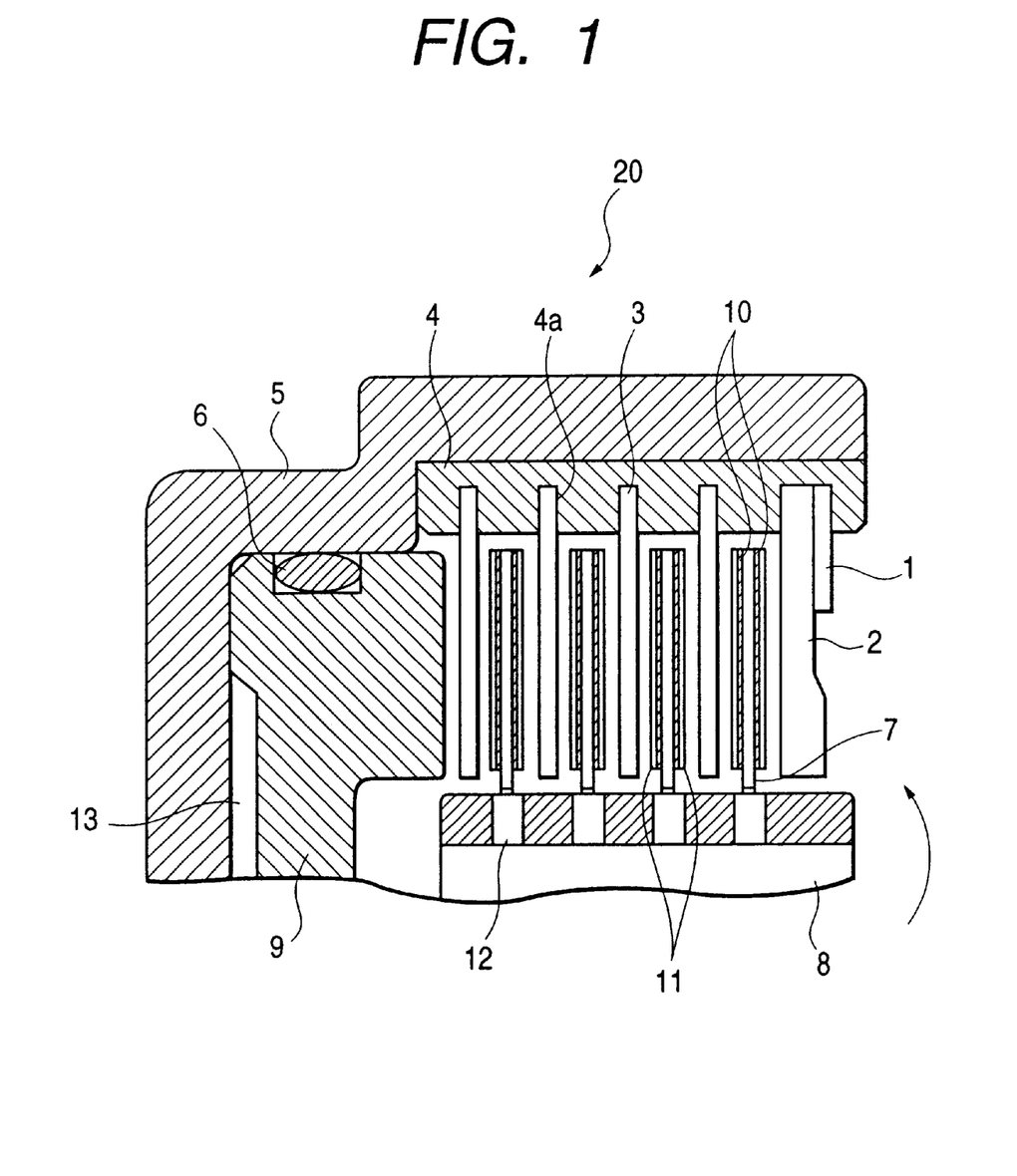
FIG. 1 is an axial cross-sectional view of the upper half of a wet type multiplate clutch according to a first embodiment of the present invention.

FIG. 1 is an axial cross-sectional view of a wet type multiplate clutch 20 according to a first embodiment of the present invention, and shows only the upper half thereof. A cylindrical retainer 4 is disposed on the inner periphery of a drum 5 opening at an axial end thereof, and splines 4a are formed in the inner periphery of the retainer 4. A plurality of annular outer tooth plates, i.e., separator plates 3, are in meshing engagement with the splines 4a.

An annular inner tooth plate, i.e., friction plate 7, is disposed between adjacent ones of the separator plates 3, and a plurality of teeth of the inner peripheral edge thereof are axially in meshing engagement with splines provided in the outer periphery of a hub 8. A flange 2 for receiving the friction plates 7 closest to the open side of the drum 5 is disposed in that end portion of the retainer 4 which is adjacent to the open side of the drum 5, and is axially fixed by a snap ring 1.

On the other hand, a piston 9 is provided on the closed side of the drum 5, and oil is introduced into an oil chamber 13 and pressure is created, whereby the piston is axially moved to bring each friction plate 7 and adjacent separator plate 3 into frictional engagement with each other.

An O-ring 6 which is a seal member is provided on the sliding surface of the piston 9. Lubricant supply holes 12 are formed in the hub 8 rotatable in the direction of the arrow so as to cool frictional materials 10 secured to the friction plates 7.

Figure 2:
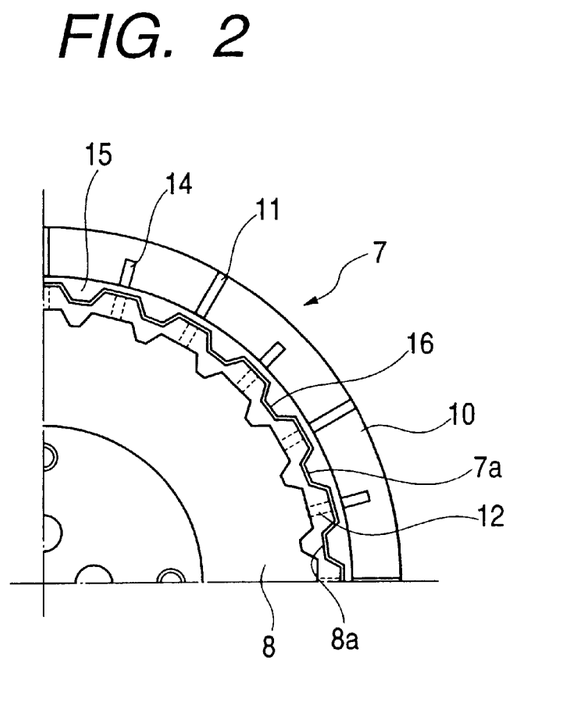
FIG. 2 is a front view of a friction plate in the first embodiment.

FIG. 2 is a front view of a friction plate 7 meshing with the spline of the hub 8. FIG. 2 shows a quarter of the whole.

As previously described, the hub 8 is formed with a plurality of radially extending lubricant supply holes 12, and each frictional material 10 is formed with through-oil grooves 11 radially extending through the inner and outer peripheral edges for enhancing the cooling effect, and non-through oil grooves 14 opening only to the inner peripheral edge for reducing the initial coefficient of dynamic friction during the frictional engagement thereof.

Splines 8a and 7a are formed in the outer periphery of the hub 8 and the inner peripheries of the friction plates 7, respectively, and are in meshing engagement with each other. A plurality of radially extending lubricant supply holes 12 are formed substantially at the centers of the convex portions of the splines 8a of the hub 8.

On the other hand, the friction plates 7 are formed by sticking and fixing the frictional materials 10 on an annular core plate 15 by an adhesive agent or the like. The frictional material 10 has an opening portion opening to the inner peripheral edge side (hub side), and is formed with oil grooves, i.e., through-oil grooves 11 extending from the inner peripheral edge to the outer peripheral edge, and oil grooves, i.e., non-through-oil grooves 14 extending from the inner peripheral edge and closed on the frictional material 10.

The lubricant supply holes 12 formed in the hub 8 are located at the front of (i.e., are opposed to) the opening portions of the through-oil grooves 11 and the non-through-oil grooves 14 which open to the inner peripheral edges thereof. In the present embodiment, all of the through-oil grooves 11 and non-through-oil grooves 14 are radially opposed to corresponding supply holes 12. However, not all need always be opposed to supply holes.

When by the construction as described above, the lubricant is supplied from the interior of the hub 8, the lubricant directly flows into the through-oil grooves 11 and the non-through-oil grooves 14. In the present embodiment, the oil flowing out of the lubricant supply holes 12 formed in the hub 8 flows directly into the through-oil grooves 11 and the non-through-oil grooves 14, whereby it has different actions on the through-oil grooves 11 extending through the inner and outer edges and the non-through-oil grooves 14 opening only to the inner peripheral edge and therefore, this point will hereinafter be described.

Figure 3:
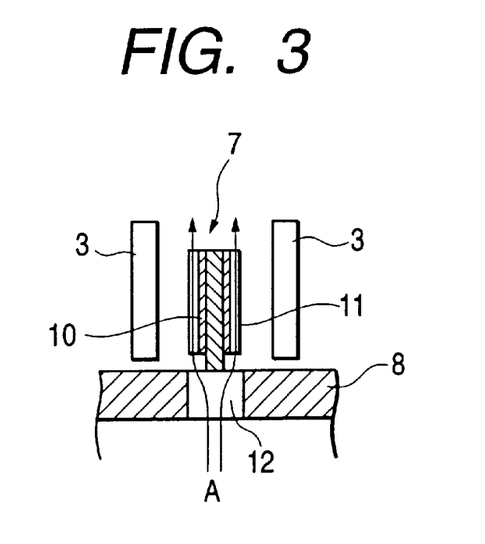
FIG. 3 is an axial cross-sectional view showing the flow of a lubricant in each embodiment of the present invention.

The lubricant flowing through the through-oil grooves 11 flows as indicated by arrow A in FIG. 3, and the dischargeability of the oil is improved. At this time, the flow of the lubricant becomes smoother because the lubricant supply holes 12 of the hub 8 and the opening portions of the inner peripheral edge side of the through-oil grooves 11 are opposed to each other. Consequently, the viscosity shearing resistance of the oil created between the friction surfaces of the friction plates 7 and the separator plates 3 is reduced. By this principle, drag torque is reduced. This effect is especially pronounced during low speed rotation.

In contrast, in the conventional example of FIG. 18, the opening portions of the oil grooves 111 of the friction plates 107 deviate from the fronts of the lubricant supply holes 112 and therefore, the flow of the lubricant is hindered.

Figure 4:
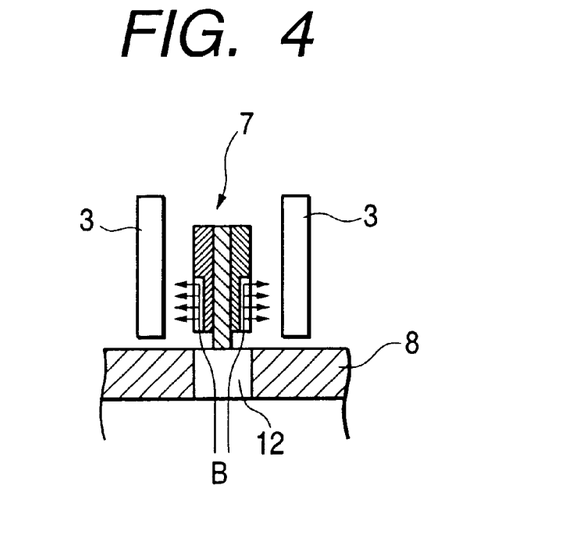
FIG. 4 is an axial cross-sectional view showing another flow of the lubricant in each embodiment of the present invention.

The non-through-oil grooves 14 opening only to the inner peripheral edge side discharge the oil toward the separator plates 3 which are partner members and therefore, oil pressure is created in the space between the two, and has the function of urging the separator plates 3 which are partner members apart from the friction plates 7. The manner in which the oil flows is indicated by arrow B in FIG. 4. By this principle, the sticking of the friction plates onto the separator plates is eliminated and therefore, the drag torque at the start of rotation is reduced.

Accordingly, in the example shown in FIG. 2, the above-described two actions occur at the same time and therefore, the reduction in drag torque can be achieved more effectively.

Figure 5:
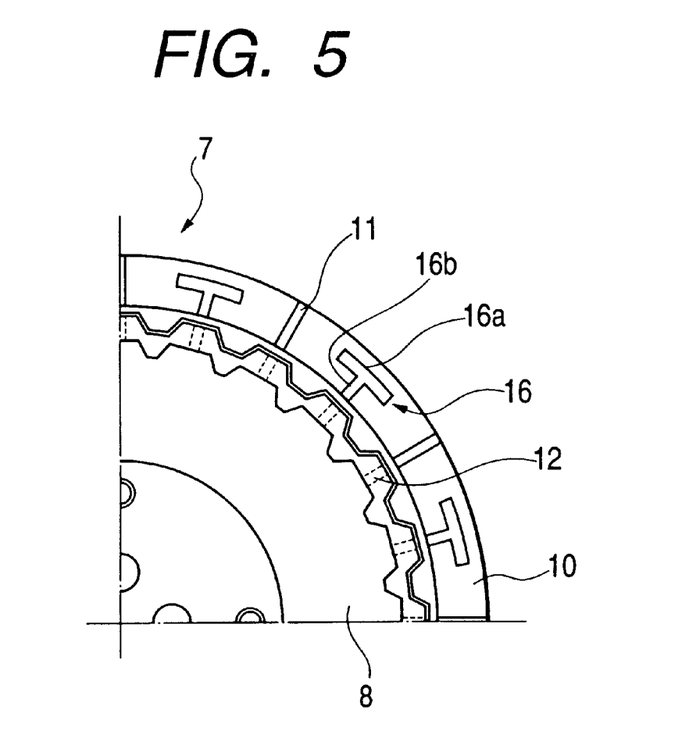
FIG. 5 is a front view of a friction plate showing a modification of the first embodiment.
Figure 6:
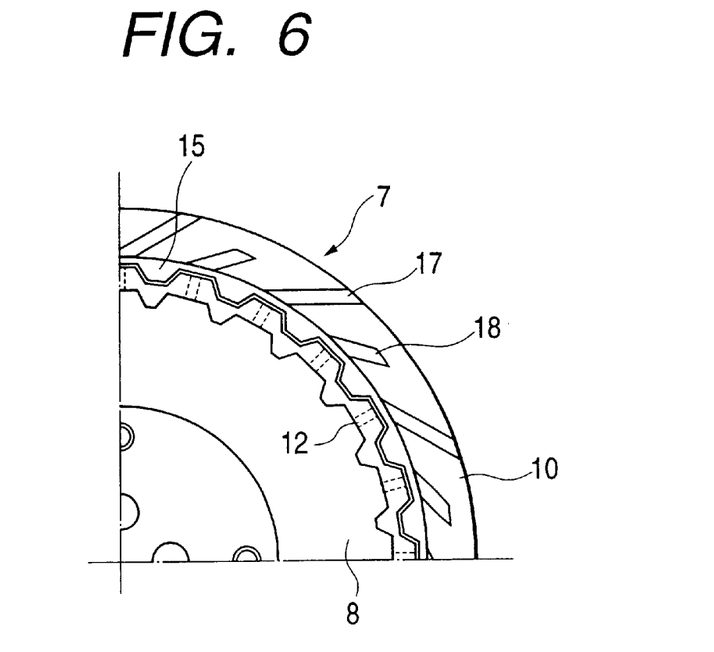
FIG. 6 is a front view of a friction plate showing another modification of the first embodiment.

A modification of the first embodiment can also be constructed so that as shown, for example, in FIG. 5, the shape of non-through-oil grooves 16 opening only to the inner peripheral edge side may be made into a T-shape and may comprise a wide portion 16a having the width of the closed end side portion thereof widened circumferentially and a straight portion 16b connected thereto. By adopting such a shape, the range in which oil pressure is created can be made wider. Also, if as shown in FIG. 6, through-oil grooves 17 and non-through oil grooves 18 are formed with angles of inclination with respect to the center of the hub 8 or a core plate 15, the centrifugal force by rotation can be utilized effectively and therefore, a greater effect can be obtained.

Figure 9:
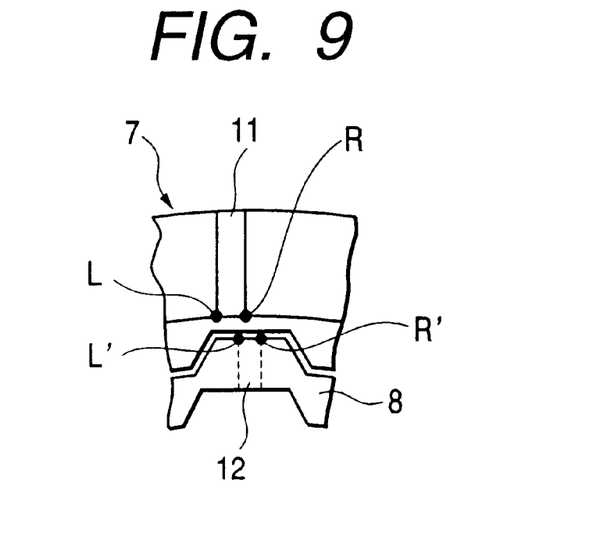
FIG. 9 is an illustration showing the allowable range of the positional deviation of oil grooves.
Figure 10:
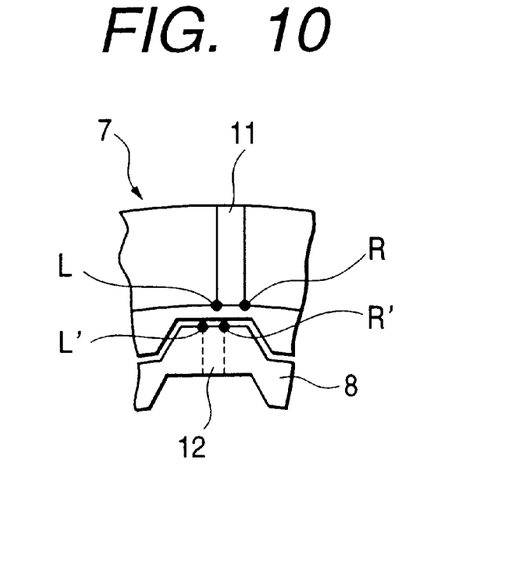
FIG. 10 is an illustration showing the allowable range of the positional deviation of the oil grooves.

Here, the terms recited in the claim that "the opening portion of the oil groove is opposed to a lubricant supply hole" are defined. FIGS. 9 and 10 are fragmentary enlarged views showing the positional relation between the lubricant supply hole 12 and the oil groove (here, the through-oil groove 11 as an example).

Herein, the term "opposed" means the following case. Two corner portions forming the opening portion of the through-oil groove 11 are defined as L and R, respectively. The opposite ends on the cross-section of the lubricant supply hole 12 are defined as L' and R', respectively. At this time, when as shown in FIG. 9, the end portion L' is diametrally extended, the corner portion R is always at the right side, that is, the corner portion R is between the end portion L' and the end portion R'. Or, as shown in FIG. 10, the corner portion L is at the left side when the end portion R' is diametrally extended, that is, the end portion R' is between the corner portion L and the corner portion R. The most effective position is that when the opening portions of the lubricant supply hole 12 and the oil groove 11 are right in front.

As demonstrated by the examples to be explained below, the number of the lubricant supply holes, the number of the through-oil grooves and non-through-oil grooves, and the number of combinations in which the opening portions of the oil grooves are opposed to the front of the lubricant supply holes can of course be freely set.

(Second Embodiment)

Figure 7:
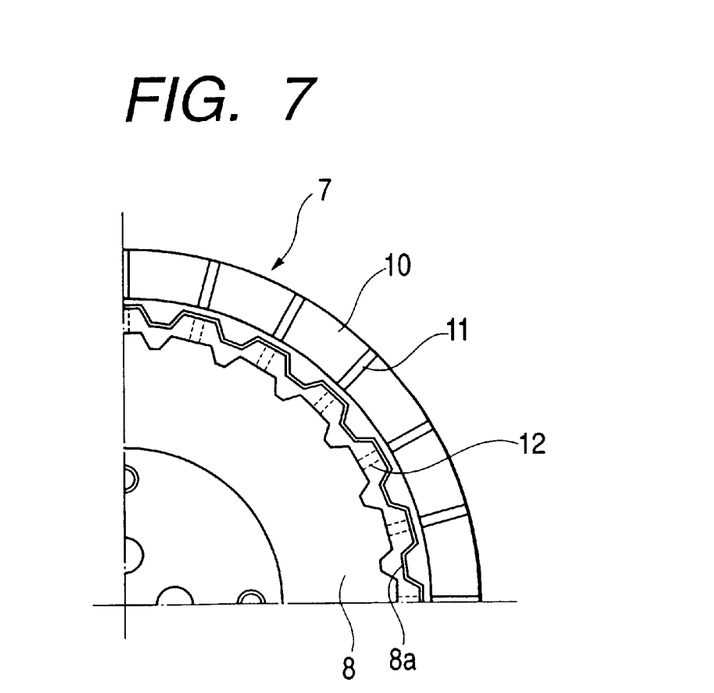
FIG. 7 is a front view of a friction plate showing a second embodiment of the present invention.
Figure 8:
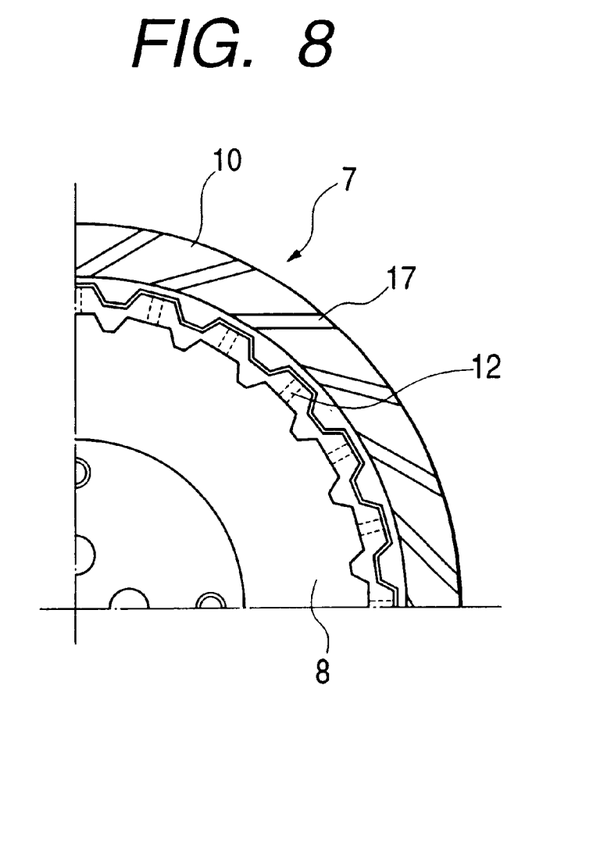
FIG. 8 is a front view of the friction plate showing the second embodiment of the present invention.

FIGS. 7 and 8 show a second embodiment of the present invention, and are front views of a friction plate 7 meshing with the spline 8a of the hub 8. FIGS. 7 and 8 show a quarter of the whole.

When of two kinds of oil grooves, the through-oil grooves 11 extending through the inner and outer edges are opposed to the lubricant supply holes 12 of the hub 8, a particularly remarkable effect is displayed and therefore, a sufficient effect can be obtained even when, as shown in FIG. 7, only the through-oil grooves 11 extending through the inner and outer edges are formed in the frictional material 10. Also, as described above, a greater effect can be obtained if as shown in FIG. 8, the through-oil grooves 17 are given a predetermined angle of inclination.

(Third Embodiment)

Figure 11:
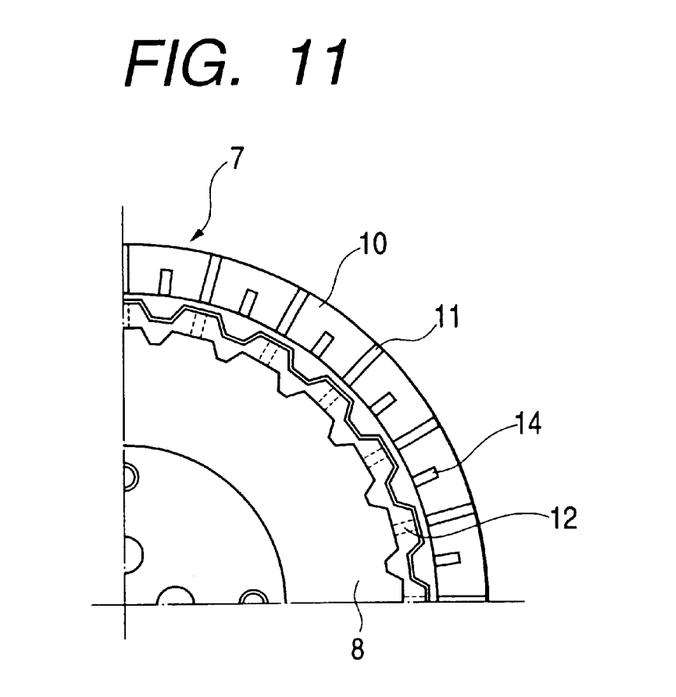
FIG. 11 is a front view of a friction plate showing a third embodiment of the present invention.
Figure 12:
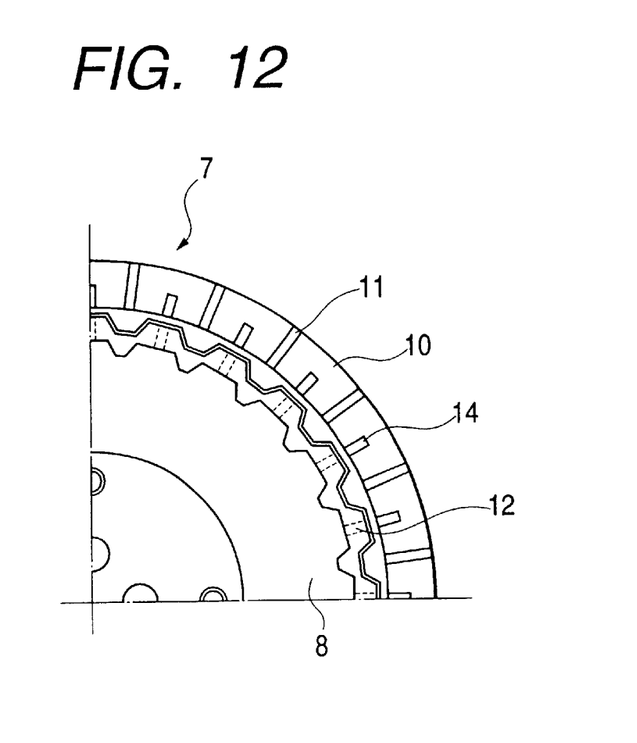
FIG. 12 is a front view of the friction plate showing the third embodiment of the present invention.

FIGS. 11 and 12 show a third embodiment of the present invention, and are front views of a friction plate 7 meshing with the spline of the hub 8. As in the other embodiments, these figures show a quarter of the whole.

The embodiment shown in FIGS. 11 and 12 is the same as the previous embodiments in that the through-oil grooves 11 and the non-through-oil grooves 14 are alternately arranged. However, in FIG. 11, only the opening portions of oil grooves of a particular kind, i.e., through-oil grooves 11, are designed to be opposed to the lubricant supply holes 12, and in FIG. 12, only the opening portions of non-through-oil grooves 14 are designed to be opposed to the lubricant supply holes 12. If this is done when, for example, the number of grooves is great and the strength of the hub may be reduced if lubricant supply holes are provided in accordance with the number of grooves, drag torque can be reduced and the friction characteristic can also be changed as required.

Figure 13:
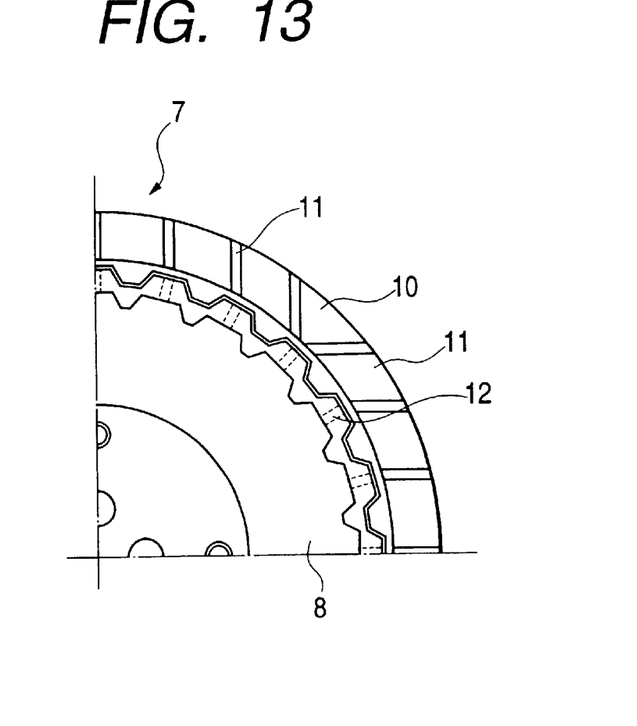
FIG. 13 is a front view of a friction plate showing another example of the through-oil groove.

The shape of the oil grooves may be other than the shapes described above, for example, the shape shown in FIG. 13, and may be any shape if the oil grooves open at least on the lubricant supply hole 12 side.

(Fourth Embodiment)

FIGS. 14 to 17 show a fourth embodiment of the present invention, and are front views of a friction plate 7 meshing with the spline of the hub 8. As in the other embodiments, these figures show a quarter of the whole.

In the fourth embodiment, the shape of the spline is made into a different shape in order to effect the alignment between lubricant supply holes 12 and the opening portions of through-oil grooves 11 or non-through-oil grooves 14.

Figure 14:
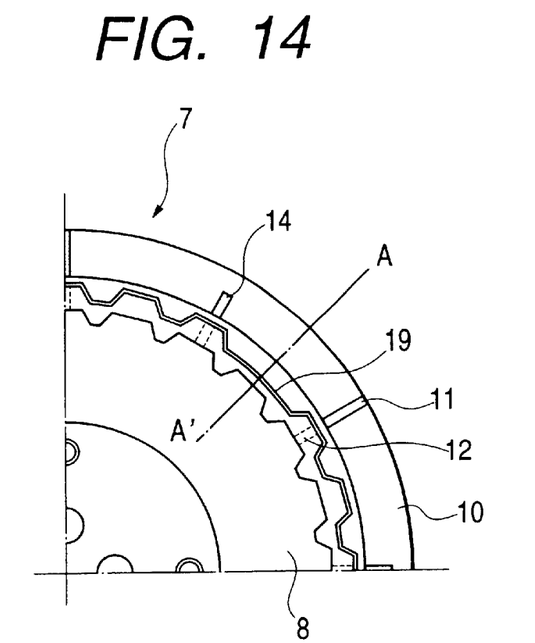
FIG. 14 is a front view of a friction plate showing a fourth embodiment of the present invention.

In FIG. 14, there is provided a circumferentially long concave portion 19 from which a spline mountain portion of the hub 8 is removed. If any number of such portions are provided and the friction plate 7 is assembled to the hub 8, it will become easy to oppose the opening portions of oil grooves such as the through-oil grooves 11 or the non-through-oil grooves 14 having opening portions on the inner peripheral edge side thereof and the locations of the lubricant supply holes 12 to each other.

Figure 15:
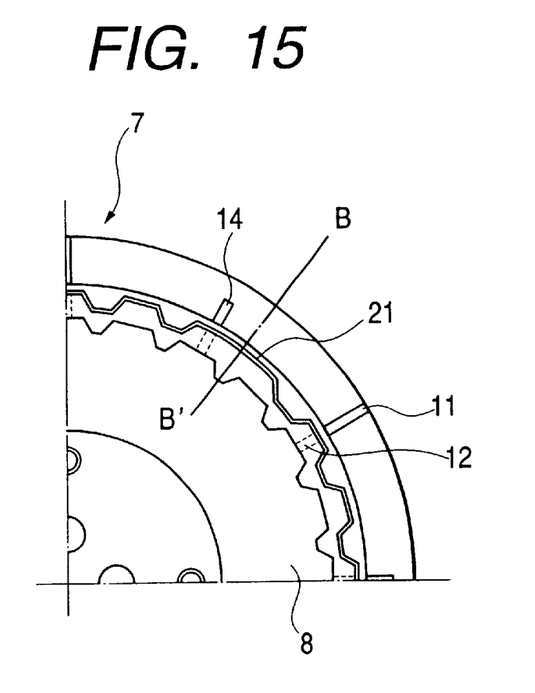
FIG. 15 is a front view of the friction plate in the fourth embodiment of the present invention.

In FIG. 15, conversely to FIG. 14, a spline valley portion of the hub 8 is filled, whereby a circumferentially long convex portion 21 is formed. In FIGS. 14 and 15, the direction of the oil grooves does not have an angle of inclination with respect to the center line and therefore, it is not necessary to distinguish between the front and back and thus, the spline of the hub 8 is of a shape symmetrical with the center line A–A' of FIG. 14 or the center line B–B' of FIG. 15. Of course, the spline of the friction plate 7 is made into a spline shape complementary thereto.

Figure 16:
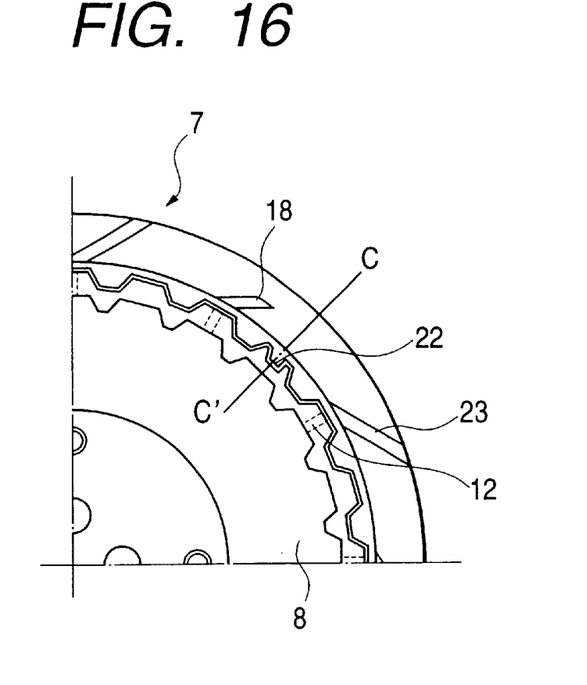
FIG. 16 is a front view of the friction plate in the fourth embodiment of the present invention.
Figure 17:
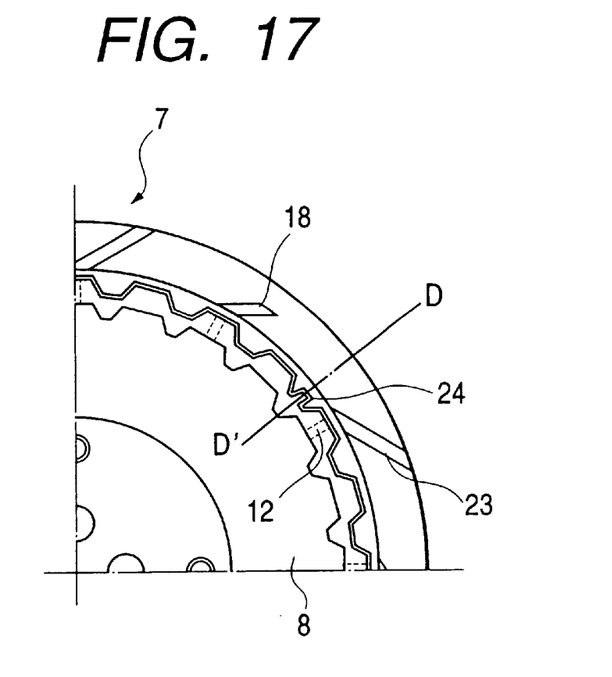
FIG. 17 is a front view of the friction plate in the fourth embodiment of the present invention.

In FIG. 16, a concave portion 22 is provided in a spline mountain portion of the hub 8, and a convex portion provided on a spline valley portion of the friction plate 7 is fitted therein. In FIG. 17, conversely to the example of FIG. 16, a convex portion 24 is provided on a spline valley portion of the hub 8, and a concave portion provided on a mountain portion of the friction plate 7 is adapted to be fitted therein. Oil grooves 18 and 23 formed in the frictional material of the friction plate 7 have predetermined angles of inclination with respect to the center line of the hub 8, and by giving these angles of inclination, a centrifugal force can be utilized more effectively. However, if these angles of inclination are given in the direction opposite to the direction of rotation, the efficiency will be reduced. So, the friction plate 7 is of an asymmetrical shape so as not to be mounted as the opposite set, i.e., in the opposite direction, to the hub 8. That is, in FIG. 16, the differently shaped portion is asymmetrical with respect to the center line C–C', and in FIG. 17, the differently shaped portion is asymmetrical with respect to the center line D–D'.

Comparison Between the Embodiments and Conventional Examples

Lastly, the drag torque in the conventional examples and the drag torque in each embodiment of the present invention will be compared with each other. As regards the oil grooves, both of the through-oil grooves 11 and the non-through-oil grooves 14 are of similar construction. Further, in the conventional examples, the location of the opening portion of each oil groove is between a lubricant supply hole and another lubricant supply hole, and the opening portion of each oil groove in the embodiments is at a location opposed to a lubricant supply hole.

Also, the conventional example A and the embodiment A are such that the direction of the oil groove has no angle of inclination with respect to the center line of the friction plate or the hub, and the conventional example B and the embodiment B are such that the direction of the oil groove has an angle of inclination of 60° with respect to the center line of the friction plate or the hub.

Figure 20:
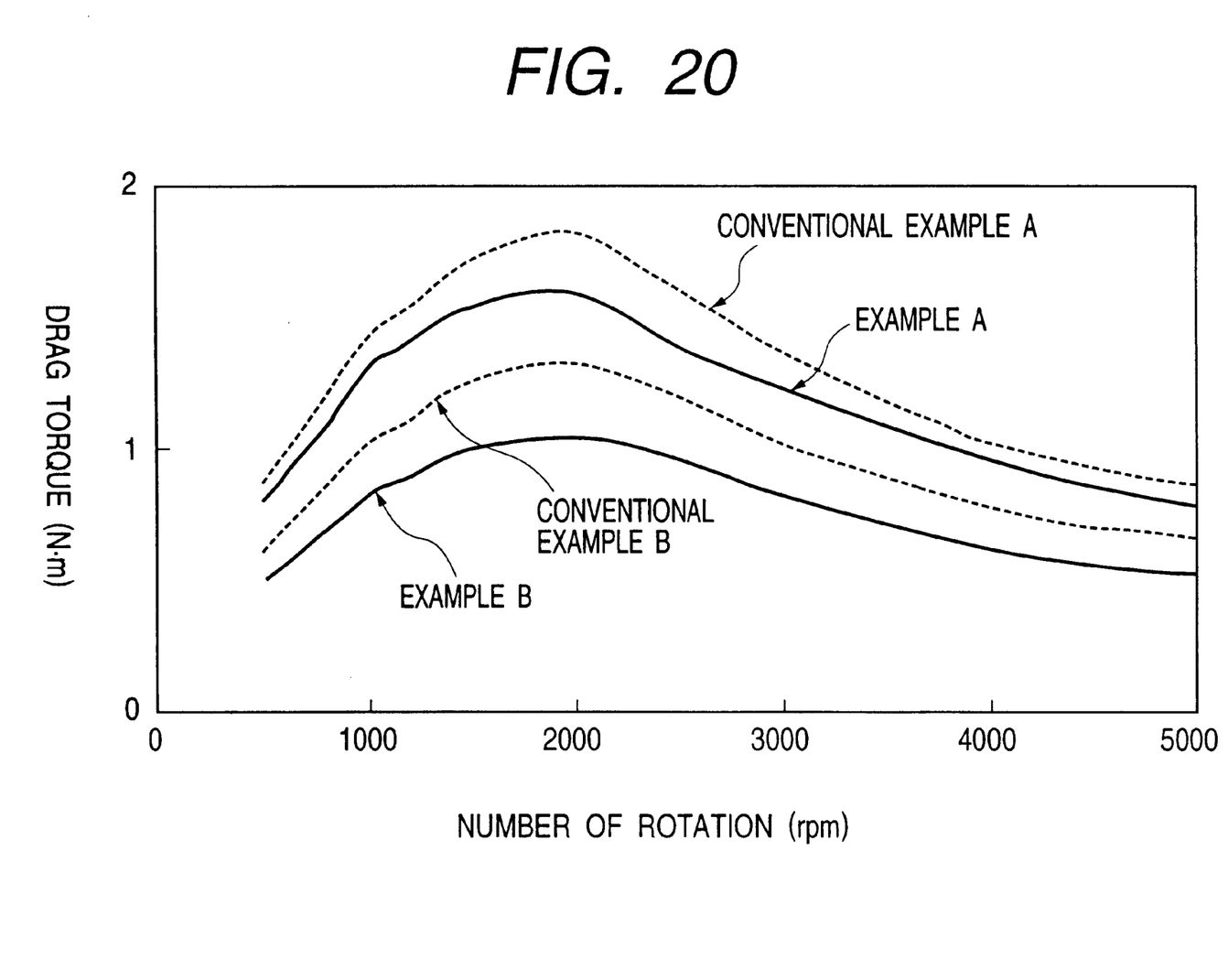
FIG. 20 is a graph showing the comparison between the drag torque in conventional examples and the drag torque in the embodiments of the present invention.

FIG. 20 is a graph in which the value of the drag torque in the embodiments and the value of the drag torque in the conventional examples are compared with each other. The comparison data are such that the number of rotations was changed between 0 to 5000 rpm and changes in the drag torque were measured. As is apparent from the graph, the drag torque in the embodiments is below the drag torque in the conventional examples. This tendency is especially pronounced within the range of the number of rotations of 800–2500 rpm. The conventional example B and the embodiment B in which the oil grooves are inclined are lower in drag torque than the conventional example A and the embodiment A in which the oil grooves are not inclined, and it is the embodiment B that was lowest in drag torque.

Figure 21:
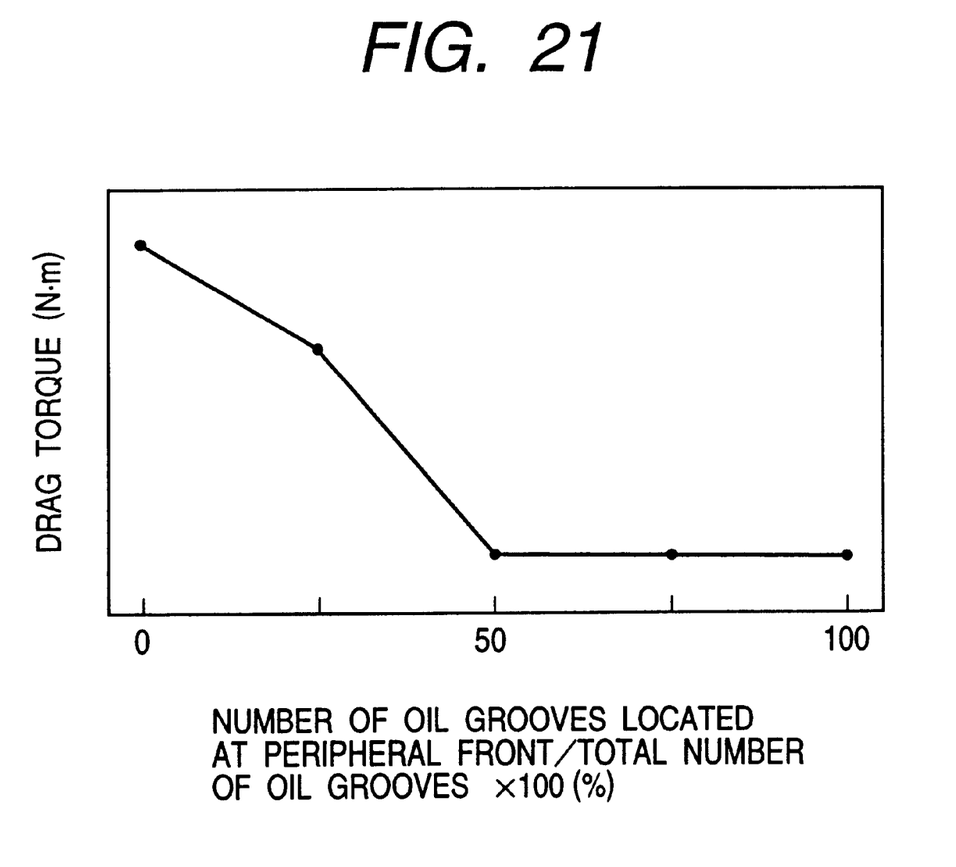
FIG. 21 is a graph showing the relation between the number of oil grooves opposed to lubricant supply holes and the drag torque.

Also, FIG. 21 shows the result of the investigation of the fluctuation of the drag torque carried out with the number of the opening portions of the oil grooves opposed to the lubricant supply holes 12 of the hub 8 (located at the peripheral front) changed when the diameters of the installed lubricant supply holes are all equal. It can be seen from this result that the drag torque becomes low if 50% or more of the opening portions of the oil grooves are located at the peripheral front of the lubricant supply holes.

In each of the above-described embodiments, the through-oil grooves and the non-through-oil grooves may be formed in the surface of the frictional material 10, or segment-like frictional materials 10 may be disposed at predetermined intervals and an oil groove can be defined on a core plate 15 between adjacent ones of the segments.

According to each embodiment of the present invention described above, there can be obtained the following effects.

The lubricant supplied from the lubricant supply holes of the hub directly flows in through the opening portions of the oil grooves provided in the frictional material and therefore, the viscosity resistance of the lubricant working between the friction plate and the separator plate or the flange becomes small for the oil grooves extending through the inner and outer peripheral edges and the drag torque becomes small, and in the oil groove opening to only the inner peripheral edge, the action of urging apart the separator plate which is the partner member is more created than in the prior art, whereby the drag torque at the start of rotation becomes small.

By the combination of the above-described two effects, an improvement in the fuel consumption of an automobile can be realized.

The above-described embodiments of the present invention are merely illustrative of the invention, and of course do not restrict the invention. It will be appreciated that various modifications, changes or improvements are possible without departing from the principles and scope of the present invention.

What is claimed is:

1. A wet type multiplate clutch in which outer tooth plates and inner tooth plates rotatable relative to each other are coaxially alternately disposed and are frictionally engaged with each other, wherein a plurality of oil grooves having opening portions opening to inner peripheral edges of frictional materials secured to said inner tooth plates are provided, and 50% or more of said opening portions are opposed to lubricant supply holes formed in a hub.

2. A wet type multiplate clutch according to claim 1, wherein said lubricant supply holes are of the same shape and are disposed at equal intervals in said hub.

3. A wet type multiplate clutch according to claim 2, wherein said oil grooves extend through the inner peripheral edges and outer peripheral edges, and are radially disposed at equal intervals on the circumferences of said frictional materials.

4. A wet type multiplate clutch according to claim 3, wherein said oil grooves are formed with an angle of inclination so as to extend non-radially of said inner tooth plates.

5. A wet type multiplate clutch according to claim 4, wherein said oil grooves comprise through-oil grooves extending through the inner peripheral edge and the outer peripheral edge and non-through-oil grooves opening only to the inner peripheral edge of the corresponding frictional material, and said through-oil grooves and said non-through-oil grooves are alternately circumferentially and radially disposed at equal intervals.

6. A wet type multiplate clutch according to claim 5, wherein said through-oil grooves and said non-through-oil grooves are formed with angles of inclination so as to extend non-radially of said inner tooth plates.

7. A wet type multiplate clutch in which outer tooth plates and inner tooth plates rotatable relative to each other are coaxially alternately disposed and are frictionally engaged with each other, wherein a plurality of oil grooves having opening portions opening to inner peripheral edges of frictional materials secured to said inner tooth plates are provided, 50% or more of said opening portions are opposed to lubricant supply holes formed in a hub, and said lubricant oil supply holes are of the same shape and disposed at equal intervals in said hub, and further wherein particular portions of splines of said inner tooth plates and said hub are of different shapes, and when they are combined together at a position whereat they are combinable, said opening portions of particular ones of said oil grooves are positioned relative to said lubricant supply holes.

8. A wet type multiplate clutch according to claim 7, wherein said oil grooves extend through the inner peripheral edges and outer peripheral edges, and are radially disposed at equal intervals on the circumferences of said frictional materials.

9. A wet type multiplate clutch according to claim 8, wherein convex portions or concave portions are formed on particular portions of the splines of said hub, and are fitted on concave portions or convex portions formed on the splines of said inner tooth plates.

10. A wet type multiplate clutch according to claim 9, wherein the pitch of the mountain portions or the pitch of the valley portions of the splines formed on said hub differs at particular portions.

11. A wet type multiplate clutch according to claim 8, wherein said oil grooves are formed with an angle of inclination so as to extend non-radially of said inner tooth plates.

12. A wet type multiplate clutch according to claim 11, wherein convex portions or concave portions are formed on particular portions of the splines of said hub, and are fitted on concave portions or convex portions formed on the splines of said inner tooth plates.

13. A wet type multiplate clutch according to claim 12, wherein the pitch of the mountain portions or the pitch of the valley portions of the splines formed on said hub differs at particular portions.

14. A wet type multiplate clutch according to claim 11, wherein said oil grooves comprise through-oil grooves extending through the inner peripheral edge and the outer peripheral edge and non-through-oil grooves opening only to the inner peripheral edge of the corresponding frictional material, and said through-oil grooves and said non-through-oil grooves are alternately circumferentially and radially disposed at equal intervals.

15. A wet type multiplate clutch according to claim 14, wherein convex portions or concave portions are formed on particular portions of the splines of said hub, and are fitted on concave portions or convex portions formed on the splines of said inner tooth plates.

16. A wet type multiplate clutch according to claim 15, wherein the pitch of the mountain portions or the pitch of the valley portions of the splines formed on said hub differs at particular portions.

17. A wet type multiplate clutch according to claim 14, wherein said through-oil grooves and said non-through-oil grooves are formed with angles of inclination so as to extend non-radially of said inner tooth plates.

18. A wet type multiplate clutch according to claim 17, wherein convex portions or concave portions are formed on particular portions of the splines of said hub, and are fitted on concave portions or convex portions formed on the splines of said inner tooth plates.

19. A wet type multiplate clutch according to claim 18, wherein the pitch of the mountain portions or the pitch of the valley portions of the splines formed on said hub differs at particular portions.

20. A wet type multiplate clutch according to claim 7, wherein convex portions or concave portions are formed on particular portions of the splines of said hub, and are fitted on concave portions or convex portions formed on the splines of said inner tooth plates.

21. A wet type multiplate clutch according to claim 20, wherein the pitch of the mountain portions or the pitch of the valley portions of the splines formed on said hub differs at particular portions.

22. A wet type multiplate clutch according to any one of claims 7, 9, 10, 12, 13, 15, 16, and 18–21, wherein the differently shaped portions of said splines of said hub are asymmetrical with respect to the center line of said hub.

* * * * *